United States Patent
Moulinie et al.

(10) Patent No.: US 7,893,135 B2
(45) Date of Patent: Feb. 22, 2011

(54) IMPACT-MODIFIED POLYALKYLENE TEREPHTHALATE/POLYCARBONATE COMPOSITIONS

(75) Inventors: Pierre Moulinie, Imperial, PA (US); Ralf Hufen, Duisburg (DE); Stephan Konrad, Dormagen (DE); Dieter Wittmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/408,050

(22) Filed: Mar. 20, 2009

(65) Prior Publication Data
US 2009/0247673 A1 Oct. 1, 2009

(30) Foreign Application Priority Data
Mar. 29, 2008 (DE) .................. 10 2008 016 260

(51) Int. Cl.
*C08J 3/20* (2006.01)
(52) U.S. Cl. .................. 523/351; 524/116; 524/117; 524/119; 524/121; 524/123
(58) Field of Classification Search .................. 523/351; 524/116, 117, 119, 121, 123
See application file for complete search history.

(56) References Cited

U.S. PATENT DOCUMENTS

| | | | |
|---|---|---|---|
| 6,074,154 A | 6/2000 | Ueda et al. | |
| 6,784,233 B1 | 8/2004 | Weber et al. | |
| 2001/0007888 A1 | 7/2001 | Asano | |
| 2003/0171472 A1 | 9/2003 | Seidel et al. | |
| 2003/0191250 A1 | 10/2003 | Seidel et al. | |
| 2004/0039090 A1 | 2/2004 | Seidel | |
| 2004/0127653 A1 | 7/2004 | Ellington et al. | |
| 2004/0254270 A1 | 12/2004 | Harashina | |
| 2004/0266916 A1 | 12/2004 | Harashina et al. | |
| 2005/0004292 A1 | 1/2005 | Harashina et al. | |
| 2006/0074154 A1* | 4/2006 | Harashina et al. | 524/115 |
| 2006/0293422 A1 | 12/2006 | Seidel et al. | |

FOREIGN PATENT DOCUMENTS

| | | |
|---|---|---|
| DE | 19930527 | 1/2001 |
| EP | 0323045 | 5/1989 |
| EP | 0323045 | 7/1989 |
| EP | 1452567 | 9/2004 |
| EP | 1466946 | 10/2004 |
| EP | 1486536 | 12/2004 |
| WO | 0181470 | 11/2001 |
| WO | 0192418 | 12/2001 |
| WO | 03080727 | 10/2003 |
| WO | 2004013227 | 2/2004 |
| WO | 2004020523 | 3/2004 |

OTHER PUBLICATIONS

International Search Report from PCT/EP2009/002027 dated May 12, 2009 (5 pages).
Scholtan et al.; "Bestimmung der Teilchengroessenverteilung von Latices mit der Ultrazentrifuge"; Kolloid Z. und Z. Polymere 250; 1972; pp. 782-796.
Ashton; The role of phosphites in stabilization of non-polyolefin polymers; GE specialty Chemicals Inc.; Morgantown, W.V., USA Annual Technical Conference—Society of Plastics Engineers (2000) 58th; vol. 3, pp. 2818-2825.
James et al.; "Inhibition of transreactions in condensation polymers"; Division of Polymer Chemistry, National Chemical Laboratory, Pune, India; 1999.
Kunststoff-Handbuch [Plastics Handbook], vol. VIII, pp. 695 et seq., Karl-Hanser-Verlag, Munich 1973 "Polyalkylenterephthalate" von Dr. Phil. Klaus-Dieter Asmus, Frankfurt A.M.—Hoechst.
International Preliminary Report on Patentability and Written Opinion for International Application PCT/EP2009/002027, dated Oct. 14, 2010 (10 pages).

\* cited by examiner

*Primary Examiner*—Edward J. Cain
(74) *Attorney, Agent, or Firm*—Baker Donelson Bearman Caldwell & Berkowitz, PC

(57) ABSTRACT

The present invention relates to compositions comprising
A) aromatic polycarbonate,
B) polyalkylene terephthalate and
C) a concentrate comprising polyalkylene terephthalate and at least one compound selected from the group consisting of ortho-phosphoric acid, phosphorous acid, carboxylic acid esters of ortho-phosphoric acid and carboxylic acid esters of phosphorous acid, Compositions of the present invention are distinguished by high melt stability. The present invention also relates to a process for the preparation of impact-modified polyalkylene terephthalate/polycarbonate compositions, wherein a concentrate of polyalkylene terephthalate with a phosphorus-containing additive is used.

19 Claims, No Drawings

IMPACT-MODIFIED POLYALKYLENE TEREPHTHALATE/POLYCARBONATE COMPOSITIONS

CROSS REFERENCE TO RELATED APPLICATIONS

This application claims priority to DE102008016260.4 filed Mar. 29, 2008, the content of which is incorporated herein by reference in its entirety.

BACKGROUND OF THE INVENTION

1. Field of the Invention

The present invention relates to compositions comprising a concentrate of polyalkylene terephthalate with a phosphorus-containing additive, which compositions are distinguished by high melt stability, and to a process for the preparation of impact-modified polyalkylene terephthalate/polycarbonate compositions, wherein a concentrate of polyalkylene terephthalate with a phosphorus-containing additive is used.

2. Description of Related Art

The stabilisation of polyalkylene terephthalates with esters of phosphoric acid is known. The esters of phosphoric acid can react with catalysts from the transesterification or from the polycondensation that are still present in the polyalkylene terephthalate and thus lessen a parameter influencing the polycarbonate/polyester transesterification reaction. Although the precise mechanism is not yet known, the effectiveness of stabilisation with the aid of esters of phosphoric acid has been described many times, such as, for example, in "The role of phosphates in stabilization of non-polyolefin polymners", Ashton, Henry C.; Enlow, William; Nelen, Tim, G E Specialty Chemicals Inc., Morgantown, W. Va., USA, Annual Technical Conference-Society of Plastics Engineers (2000), 58th (Vol. 3), 2818-2825 or in "Inhibition of transreactions in condensation polymers", James, N. R.; Mahajan, S. S.; Sivaram, S., Division of Polymer Chemistry, National Chemical Laboratory, Pune, India., Editor(s): Fakirov, Stoyko., Transreactions in Condensation Polymers (1999), 219-265; Publisher: Wiley-VCH Verlag GmbH, Weinheim, Germany.

U.S. Pat. No. 4,066,617 discloses polyalkylene terephthalates containing esters of phosphoric acid with oxetan groups. WO 2004/007607 A discloses polymers phosphoric acid esters with oxetan groups. The use of carboxyalkylphosphoniic acid as auxiliary agent for the preparation of polyesters is disclosed, for example, in U.S. Pat. No. 5,744,572.

US 2002/0137823 discloses compositions comprising polyesters and esters of phosphoric acid, which compositions are distinguished by improved hydrolytic stability.

Phosphoric acid in a low concentration and used in the form of an aqueous solution is used to stabilise polycarbonate/polyester compositions (see, for example, Examples 7 to 10 of U.S. Pat. No. 6,635,698).

EP 0 294 862 A discloses the stabilisation of polycarbonate/polyester compositions with the aid of a combination of a phosphorus-containing stabiliser and elemental sulfur. EP 0 683 200 A describes the advantages of stabilising polycarbonate with the aid of phosphorus-containing acid and esters of a phosphorus-containing acid.

In the prior art, the stabilisers are used in a concentration of up to 1 to 2 wt. % and the stabilisers are in each case, generally added directly to the mixture.

SUMMARY OF THE INVENTION

An object of the present invention was to improve the melt stability of polycarbonate/polyester compositions.

It has now been found, surprisingly, that this object according to the invention can be achieved by compositions comprising
- A) aromatic polycarbonate,
- B) polyalkylene terephthalate and
- C) a concentrate comprising polyalkylene terephthalate and at least one compound selected from the group consisting of ortho-phosphoric acid, phosphorous acid, carboxylic acid esters of ortho-phosphoric acid and carboxylic acid esters of phosphorous acid.

Other products and methods in accordance with the present invention are provided in the detailed description and claims that follow below. Additional objects, features, and advantages will be sent forth in the description that follows, and in part, will be obvious from the description, or may be learned by practice of the invention. The objects, features, and advantages may be realized and obtained by means of the instrumentalities and combination particularly pointed out in the appended claims.

DETAILED DESCRIPTION OF A PREFERRED EMBODIMENT

The compositions according to the invention preferably comprise

- A) from 29.8 to 82.8 parts by weight, preferably from 39.5 to 89.5 parts by weight, particularly preferably from 44.3 to 74.3 parts by weight (in each case based on the sum of the parts by weight of components A+B+C) of aromatic polycarbonate,
- B) from 15 to 70 parts by weight, preferably from 20 to 60 parts by weight, particularly preferably from 25 to 55 parts by weight (in each case based on the sum of the parts by weight of components A+B+C) of polyalkylene terephthalate,
- C) from 0.2 to 5 parts by weight, preferably from 0.5 to 3 parts by weight, particularly preferably from 0.7 to 2 parts by weight (in each case based on the sum of the parts by weight of components A+B+C) of a concentrate comprising (or consisting essentially of)
  - C.1) from 98 wt. % to 70 wt. %, preferably from 93 wt. % to 80 wt. % (based on the sum of the wt. % of C.1)+C.2)) of polyalkylene terephthalate or a mixture of at least two polyalkylene terephthalates and
  - C.2) from 2 wt. % to 30 wt. %, preferably from 7 wt. % to 20 wt. % (based on the sum of the wt. % of C.1)+C.2)) of at least one compound selected from the group consisting of ortho-phosphoric acid, phosphorous acid, carboxylic acid esters of ortho-phosphoric acid and carboxylic acid esters of phosphorous acid,
- D) from 0 to 40 parts by weight, preferably from 5 to 30 parts by weight, particularly preferably from 8 to 18 parts by weight (in each case based on the sum of the parts by weight of components A+B+C) of rubber-modified graft polymer and
- E) from 0 to 20 parts by weight, preferably from 1 to 15 parts by weight (based on the sum of the parts by weight of components A+B+C=100) of additives, wherein all parts by weight in the present application are so standardised that the sum of the parts by weight of components A+B+C in the composition is 100.

The invention also provides a process for the preparation of polycarbonate/polyalkylene terephthalate compositions having improved melt stability. An exemplary process comprises (i) in the first step, preparing a concentrate C), wherein
   (i-1) the components
      C.1) from 98 wt. % to 70 wt. %, preferably from 93 wt. % to 80 wt. % (based on the sum of the wt. % of C.1)+C.2)) of a melt, preferably having a temperature of from 180 to 300° C., particularly preferably from 200 to 270° C., of polyalkylene terephthalate, preferably polyethylene terephthalate or polybutylene terephthalate, particularly preferably polybutylene terephthalate, and
      C.2) from 2 wt. % to 30 wt. %, preferably from 7 wt. % to 20 wt. % (based on the sum of the wt. % of C.1)+C.2)) of at least one compound selected from the group consisting of ortho-phosphoric acid, phosphorous acid, carboxylic acid esters of ortho-phosphoric acid and carboxylic acid esters of phosphorous acid, component C.2) being used in the form of a solid or in liquid form,
   are mixed (which can be in any manner), preferably at temperatures of from 180° C. to 320° C., particularly preferably from 200° C. to 270° C., and preferably in devices such as internal kneaders, extruders and twin-shaft screws (this process step is also referred to as "melt compounding") and
   (i-2) the resulting mixture is then melt extruded, the resulting mixture preferably being cooled to a temperature of from −20° C. to 100° C., particularly preferably from 10 to 40° C., so that the mixture (referred to hereinbelow as "concentrate C") is obtained in solid form, and (ii) in the second step
   (ii-1) the following constituents are mixed:
      A) from 29.8 to 82.8 parts by weight, preferably from 39.5 to 89.5 parts by weight, particularly preferably from 44.3 to 74.3 parts by weight (in each case based on the sun of the parts by weight of components A+B+C) of aromatic polycarbonate,
      B) from 15 to 70 parts by weight preferably from 20 to 60 parts by weight, particularly preferably from 25 to 55 parts by weight (in each case based on the sum of the parts by weight of components A+B+C) of polyalkylene terephthalate,
      C) from 0.2 to 5 parts by weight, preferably from 0.5 to 3 parts by weight, particularly preferably from 0.7 to 2 parts by weight (in each case based on the sum of the parts by weight of components A+B+C) of the concentrate C) prepared according to step (i),
      D) from 0 to 40 parts by weight, preferably from 5 to 30 parts by weight, particularly preferably from 8 to 18 parts by weight (in each case based on the sum of the parts by weight of components A+B+C) of rubber-modified graft polymer and
      E) from 0 to 50 parts by weight, preferably from 0.5 to 25 parts by weight (in each case based on the sum of the parts by weight of components A+B+C=100) of additives
   These components can be mixed in any desired manner and
   (ii-2) melt compounded preferably at a temperature of from 200° C. to 320° C., particularly preferably from 240° C. to 300° C., in conventional devices such as internal kneaders, extruders and twin-shaft screws and
   (ii-3) then melt extruded,
   wherein all parts by weight in the present application are so standardised that the sum of the parts by weight of components A+B+C in the composition is 100.

The present invention further provides a concentrate C) comprising (or consisting essentially of):

C.1) from 98 wt. % to 70 wt. %, preferably from 93 wt. % to 80 wt. % (based on the sum of the wt. % of C.1)+C.2)) of polyalkylene terephthalate or a mixture of at least two polyalkylene terephthalates, preferably polyethylene terephthalate or polybutylene terephthalate, particularly preferably polybutylene terephthalate, and C.2) from 2 wt. % to 30 wt. %, preferably from 7 wt. % to 20 wt. % (based on the sum of the wt. % of C.1)+C.2)) of at least one compound selected from the group consisting of ortho-phosphoric acid, phosphorous acid, carboxylic acid esters of ortho-phosphoric acid and carboxylic acid esters of phosphorous acid.

The present invention further provides the use of the concentrate C) for improving the melt stability of compositions containing aromatic polycarbonate and polyalkylene terephthalate, optionally rubber-modified graft polymer and optionally one or more additives.

Component A

According to the invention, the compositions according to the invention contain as component A) a polycarbonate or a mixture of polycarbonates.

Preferred polycarbonates are homopolycarbonates and copolycarbonates based on the bisphenols of the general formula (I)

wherein Z is a divalent organic radical having from 6 to 30 carbon atoms which contains one or more aromatic groups.

Preference is given to bisphenols of formula (Ia)

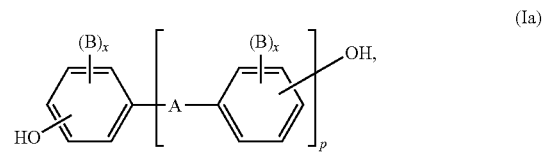

wherein

A represents a single bond, $C_1$-$C_5$-alkylene, $C_2$-$C_5$-alkylidene, $C_5$-$C_6$-cycloalkylidene, —O—, —SO—, —CO—, —S—, —$SO_2$—, $C_6$-$C_2$-arylene, to which there can be fused further aromatic rings optionally containing heteroatoms, or a radical of formula (II) or (III)

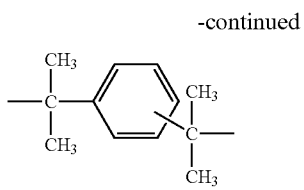
(III)

B in each case represents $C_1$-$C_{12}$-alkyl, preferably methyl, halogen, preferably chlorine and/or bromine, x in each case independently of the other represents 0, 1 or 2, p is 1 or 0, and $R^1$ and $R^2$ can be chosen individually for each $X^1$ and represent, independently of one another, hydrogen or $C_1$-$C_6$-alkyl, preferably hydrogen, methyl or ethyl, $X^1$ represents carbon and m represents an integer from 4 to 7, preferably 4 or 5, with the proviso that on at least one atom $X^1$, $R^1$ and $R^2$ are simultaneously alkyl.

Examples of bisphenols of the general formula (I) are bisphenols belonging to the following groups: dihydroxydiphenyls, bis-(hydroxyphenyl)-alkanes, bis-(hydroxyphenyl)-cycloalkanes, indane bisphenols, bis-(hydroxyphenyl) sulfides, bis-(hydroxyphenyl)ethers, bis-(hydroxyphenyl) ketones, bis-(hydroxyphenyl)-sulfones, bis-(hydroxyphenyl) sulfoxides and α,α'-bis-(hydroxyphenyl)-diisopropylbenzenes.

Derivatives of the mentioned bisphenols which are obtainable, for example, by alkylation or halogenation on the aromatic rings of the mentioned bisphenols are also examples of bisphenols of the general formula (I).

Examples of bisphenols of the general formula (I) are in particular the following compounds: hydroquinone, resorcinol, 4,4'-dihydroxydiphenyl, bis-(4-hydroxyphenyl) sulfide, bis-(4-hydroxyphenyl)sulfone, bis-(3,5-dimethyl-4-hydroxyphenyl)-methane, bis-(3,5-dimethyl-4-hydroxyphenyl)-sulfone, 1,1-bis-(3,5-dimethyl-4-hydroxyphenyl)-p/m-diisopropylbenzene, 1,1-bis-(4-hydroxyphenyl)-1-phenyl-ethane, 1,1-bis-(3,5-dimethyl-4-hydroxyphenyl)-cyclohexane, 1,1-bis-(4-hydroxyphenyl)-3-methylcyclohexane, 1,1-bis-(4-hydroxyphenyl)-3,3-dimethylcyclohexane, 1,1-bis-(4-hydroxyphenyl)-4-methylcyclohexane, 1,1-bis-(4-hydroxyphenyl)-cyclohexane, 1,1-bis-(4-hydroxyphenyl)-3,3,5-trimethylcyclohexane, 2,2-bis-(3,5-dichloro-4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-propane (i.e. bisphenol A), 2,2-bis-(3-chloro-4-hydroxyphenyl)-propane, 2,2-bis-(3,5-dibromo-4-hydroxyphenyl)-propane, 2,4-bis-(4-hydroxyphenyl)-2-methyl-butane, 2,4-bis-(3,5-dimethyl-4-hydroxyphenyl)-2-methylbutane, α,α'-bis-(4-hydroxyphenyl)-o-diisopropylbenzene, α,α'-bis-(4-hydroxyphenyl)-m-diisopropylbenzene (i.e. bisphenol M), α,αx'-bis-(4-hydroxyphenyl)-p-diisopropylbenzene and indane bisphenol.

Particularly preferred polycarbonates are the homopolycarbonate based on bisphenol A, the homopolycarbonate based on 1,1-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

The described bisphenols of the general formula (I) can be prepared by known processes, for example from the corresponding phenols and ketones.

The mentioned bisphenols and processes for their preparation are described, for example, in the monograph H. Schnell, "Chemistry and Physics of Polycarbonates", Polymer Reviews, Volume 9, p. 77-98, Interscience Publishers, New York, London, Sydney, 1964 and in U.S. Pat. No. 3,028,635, in U.S. Pat. No. 3,062,781, in U.S. Pat. No. 2,999,835, in U.S. Pat. No. 3,148,172, in U.S. Pat. No. 2,991,273, in U.S. Pat. No. 3,271,367, in U.S. Pat. No. 4,982,014, in U.S. Pat. No. 2,999,846, in DE-A 1 570 703, in DE-A 2 063 050, in DE-A 2 036 052, in DE-A 2 211 956, in DE-A 3 832 396, and in FR-A 1 561 518 as well as in the Japanese Offenlegungsschriften having application numbers JP-A 62039 1986, JP-A 62040 1986 and JP-A 105550 1986.

1,1-Bis-(4-hydroxyphenyl)-3,3,5-trimethylcyclohexane and its preparation are described, for example, in U.S. Pat. No. 4,982,014.

Indane bisphenols and their preparation are described, for example, in U.S. Pat. No. 3,288,864, in JP-A 60 035 150 and in U.S. Pat. No. 4,334,106. Indane bisphenols can be prepared, for example, from isopropenylphenol or its derivatives or from dimers of isopropenylphenol or its derivatives in the presence of a Friedel-Crafts catalyst in organic solvents.

Polycarbonates can be prepared by known processes. Suitable processes for the preparation of polycarbonates are, for example, preparation from bisphenols with phosgene by the interfacial process or from bisphenols with phosgene by the process in homogeneous phase, the so-called pyridine process, or from bisphenols with carbonic acid esters by the melt transesterification process. These preparation processes are described, for example, in H. Schnell, "Chemistry and Physics of Polycarbonates", Polymer Reviews, Volume 9, p. 31-76, Interscience Publishers, New York, London, Sydney, 1964. The mentioned preparation processes are also described in D. Freitag, U. Grigo, P. R. Müller, H. Nouvertne, "Polycarbonates" in Encyclopedia of Polymer Science and Engineering, Volume 11, Second Edition, 1988, pages 648 to 718 and in U. Grigo, K. Kircher and P. R. Müller "Polycarbonate" in Becker, Braun, Kunststoff-Handbuch, Volume 3/1, Polycarbonate, Polyacetale, Polyester, Celluloseester, Carl Hanser Verlag Munich, Vienna 1992, pages 117 to 299 and in D. C. Prevorsek, B. T. Debona and Y. Kesten, Corporate Research Center, Allied Chemical Corporation, Morristown, N.J. 07960, "Synthesis of Poly(estercarbonate) Copolymers" in Journal of Polymer Science, Polymer Chemistry Edition, Vol. 19, 75-90 (1980).

The melt transesterification process is described in particular, for example, in H. Schnell, "Chemistry and Physics of Polycarbonates", Polymer Reviews, Volume 9, p. 44 to 51, Interscience Publishers, New York, London, Sydney, 1964 and also in DE-A 1 031 512.

In the preparation of polycarbonate, raw materials and auxiliary substances with a low degree of impurities are preferably used. In the case of preparation by the melt transesterification process in particular, the bisphenols and carbonic acid derivatives used should be as free as possible of alkali ions and alkaline earth ions. Such pure raw materials are obtainable, for example, by recrystallisation, washing or distillation of the carbonic acid derivatives, for example carbonic acid esters, and the bisphenols.

The polycarbonates that are suitable according to the invention preferably have a weight-average molar mass ($\overline{M}_w$), which can be determined, for example, by ultracentrifugation or scattered light measurement, of from 10,000 to 200,000 g/mol. Particularly preferably they have a weight-average molar mass of from 12,000 to 80,000 g/mol, especially preferably from 20,000 to 35,000 g/mol.

The mean molar mass of the polycarbonates according to the invention can be adjusted, for example, in a known manner by an appropriate amount of chain terminators. The chain terminators can be used individually or in the form of a mixture of different chain terminators.

Suitable chain terminators are both monophenols and monocarboxylic acids. Suitable monophenols are, for example, phenol, p-chlorophenol, p-tert-butylphenol, cumylphenol or 2,4,6-tribromophenol, as well as long-chained alkylphenols, such as, for example, 4-(1,1,3,3-tetramethylbutyl)-phenol, or monoalkylphenols or dialkylphenols having a total of from 8 to 20 carbon atoms in the alkyl substituents, such as, for example, 3,5-di-tert-butylphenol, p-tert-octylphenol, p-dodecylphenol, 2-(3,5-dimethyl-heptyl)-phenol or 4-(3,5-dimethyl-heptyl)-phenol. Suitable monocarboxylic acids are benzoic acid, alkylbenzoic acids and halobenzoic acids.

Preferred chain terminators are phenol, p-tert-butylphenol, 4-(1,1,3,3-tetramethylbutyl)-phenol and cumylphenol.

The amount of chain terminators is preferably from 0.25 to 10 mol %, based on the sum of the bisphenols used in a particular case.

The polycarbonates that are suitable according to the invention can be branched in a known manner, preferably by the incorporation of branching agents having a functionality of three or more. Suitable branching agents are, for example, those having three or more than three phenolic groups or those having three or more than three carboxylic acid groups.

Suitable branching agents are, for example, phloroglucinol, 4,6-dimethyl-2,4,6-tri-(4-hydroxy-phenyl)-hept-2-ene, 4,6-dimethyl-2,4,6-tri-(4-hydroxyphenyl)-heptane, 1,3,5-tri-(4-hydroxy-phenyl)-benzene, 1,1,1-tris-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2, 4-dihydroxy-phenyl)-propane, hexa-(4-(4-hydroxyphenyl-isopropyl)-phenyl)-terephthalic acid ester, tetra-(4-hydroxyphenyl)-methane, tetra-(4-(4-hydroxyphenyl-isopropyl)-phenoxy)-methane and 1,4-bis-(4',4''-dihydroxytriphenyl)-methylbenzene as well as 2,4-dihydroxybenzoic acid, trimesic acid, cyanuric chloride, 3,3-bis-(3-methyl-4-hydroxyphenyl)-2-oxo-2,3-dihydroindole, trimesic acid trichloride and $\alpha,\alpha',\alpha''$-tris-(4-hydroxyphenol)-1,3,5-triisopropylbenzene.

Preferred branching agents are 1,1,1-tris-(4-hydroxyphenyl)-ethane and 3,3-bis-(3-methyl-4-hydroxyphenyl)-2-oxo-2,3-dihydroindole.

The amount of branching agents optionally to be used is preferably from 0.05 mol % to 2 mol %, based on moles of bisphenols used.

In the case of the preparation of the polycarbonate by the interfacial process, the branching agents can, for example, be placed in the aqueous alkaline phase with the bisphenols and the chain terminators or they can be added, in solution in an organic solvent, together with the carbonic acid derivatives. In the case of the transesterification process, the branching agents are preferably metered in together with the dihydroxy aromatic compounds or bisphenols.

Catalysts that are preferably to be used in the preparation of polycarbonate by the melt transesterification process are the ammonium salts and phosphonium salts known in the literature (see, for example, U.S. Pat. No. 3,442,864, JP-A-14742/72, U.S. Pat. No. 5,399,659 and DE-A 19 539 290).

Copolycarbonates can also be used. Copolycarbonates within the scope of the invention are in particular polydiorganosiloxane-polycarbonate block copolymers whose weight-average molar mass ($\overline{M}_w$) is preferably from 10,000 to 200,000 g/mol, particularly preferably from 20,000 to 80.000 g/mol (determined by gel chromatography after prior calibration by scattered light measurement or ultracentrifugation). The content of aromatic carbonate structural units in the polydiorganosiloxane-polycarbonate block copolymers is preferably from 75 to 97.5 wt. %, particularly preferably from 85 to 97 wt. %. The content of polydiorganosiloxane structural units in the polydiorganosiloxane-polycarbonate block copolymers is preferably from 25 to 2.5 wt. %, particularly preferably from 15 to 3 wt. %. The polydiorganosiloxane-polycarbonate block copolymers can be prepared, for example, starting from polydiorganosiloxanes containing $\alpha,\omega$-bishydroxyaryloxy end groups and having a mean degree of polymerisation of preferably $P_n$=from 5 to 100, particularly preferably $P_n$=from 20 to 80.

Conventional additives such as, for example, mould release agents can be mixed if desired for any reason, with the polycarbonates in the melt or applied to the surface. The polycarbonates used preferably already contain mould release agents prior to compounding with the other components of the moulding compositions according to the invention.

Component B

According to the invention, the compositions contain as component B) polyalkylene terephthalate, wherein a mixture of two or more different polyalkylene terephthalates can also be present. Polyalkylene terephthalates within the scope of the invention are polyalkylene terephthalates derived from terephthalic acid (or reactive derivatives thereof) and alkanediols, for example based 300 on propylene glycol or butanediol. According to the invention there are used as component B) preferably polyethylene terephthalate, polybutylene terephthalate and/or polytrimethylene terephthalate, most preferably polybutylene terephthalate.

Polyalkylene terephthalates within the scope of the invention include reaction products of aromatic dicarboxylic acids or reactive derivatives thereof (e.g. dimethyl esters or anhydrides) and aliphatic, cycloaliphatic or araliphatic diols, and mixtures of these reaction products.

Preferred polyalkylene terephthalates can be prepared, for example, by any desired methods from terephthalic acid (or reactive derivatives thereof) and aliphatic or cycloaliphatic diols having from 2 to 10 carbon atoms (Kunstoff-Handbuch, Vol. VIII, p. 695 ff, Karl-Hanser-Verlag, Munich 1973).

Preferred polyalkylene terephthalates contain at least 80 mol %, preferably at least 90 mol %, based on the dicarboxylic acid, of terephthalic acid radicals and at least 80 mol %, preferably at least 90 mol %, based on the diol component, of ethylene glycol and/or 1,3-propanediol and/or 1,4-butanediol radicals.

The preferred polyalkylene terephthalates can contain, in addition to terephthalic acid radicals, up to 20 mmol % of radicals of other aromatic dicarboxylic acids having from 8 to 14 carbon atoms or aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid, cyclohexanedicarboxylic acid.

The preferred polyalkylene terephthalates can contain, in addition to ethylene or 1,3-propanediol or 1,4-butanediol glycol radicals, up to 20 mol % of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-methyl-2,4-pentanediol, 2-methyl-2,4-pentanediol, 2,2,4-trimethyl-1,3- and -1,6-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-p-hydroxyethoxy-phenyl)-propane and 2,2-bis-(4-hydroxy-propoxyphenyl)-propane (DE-A 2 407 674, 2 407 776, 2 715 932).

The polyalkylene terephthalates can be branched by the incorporation of relatively small amounts of tri- or tetrahydric alcohols or tri- or tetra-basic carboxylic acids, as are described, for example, in DE-A 19 00 270 and U.S. Pat. No. 3,692,744. Examples of preferred branching agents are trimesic acid, trimellitic acid, trimethylol-ethane and -propane and pentaerythritol.

It is advisable in some embodiments to use not more than 1 mol % of the branching agent, based on the acid component.

Particular preference is given to polyalkylene terephthalates which have been prepared solely from terephthalic acid or reactive derivatives thereof (e.g. dialkyl esters thereof, such as dimethyl terephthalate) and ethylene glycol and/or 1,3-propanediol and/or 1,4-butanediol (polyethylene and polybutylene terephthalate) and mixtures of these polyalkylene terephthalates.

Preferred polyalkylene terephthalates are also copolyesters prepared from at least two of the above-mentioned acid components and/or from at least two of the above-mentioned alcohol components; particularly preferred copolyesters are poly(ethylene glycol/1,4-butanediol) terephthalates.

The polyalkylene terephthalates generally have an intrinsic viscosity of approximately from 0.4 to 1.5 dl/g, preferably from 0.5 to 1.3 dl/g. The intrinsic viscosity is calculated from the solution viscosity measured at different concentrations in a suitable solvent (see ASTM D-4603). Suitable solvents are, for example, dichloroacetic acid, a mixture (1:1 parts by weight) of phenol and ortho-dichlorobenzene or a mixture (1:1 parts by weight) of phenol and tetrachloroethane. The intrinsic viscosity is the extrapolated viscosity at a concentration of "zero". Alternatively, a viscosity number can be determined according to ISO 1628-1.

The polyesters prepared according to the invention can preferably also be used in admixture with other polyesters and/or further polymers. Particular preference is given to the use of mixtures of polyalkylene terephthalates with other polyesters.

Conventional additives, such as, for example, mould release agents, stabilisers and/or flow improvers, can be mixed with the polyesters in the melt or applied to the surface.

Component C

The compositions according to the invention contain as component C) a concentrate C) which preferably consists of C.1) from 98 wt. % to 70 wt. %, preferably from 93 wt. % to 80 wt. % (based on the sum of the wt. % of C.1)+C.2)) of polyalkylene terephthalate or a mixture of at least two different polyalkylene terephthalates and C.2) from 2 wt. % to 30 wt. %, preferably from 7 wt. % to 20 wt. % (based on the sum of the wt. % of C.1)+C.2)) of at least one compound selected from the group consisting of ortho-phosphoric acid, phosphorous acid, carboxylic acid esters of ortho-phosphoric acid and carboxylic acid esters of phosphorous acid.

As component C.1) there is preferably used a polyalkylene terephthalate according to component B). Component C.1) is particularly preferably polyethylene terephthalate or polybutylene terephthalate, especially preferably polybutylene terephthalate.

In a preferred embodiment there is used as component C.1) the same polyalkylene terephthalate as is used as component B) or, if a mixture of a plurality of polyalkylene terephthalates is used as component B), component C.1) is at least one of the polyalkylene terephthalates present in the mixture according to component B).

As component C.2) there is preferably used at least one compound selected from the group consisting of C.2.1) compound of formula (IV) (2-carboxyethyl-1-phosphonic acid, CAS # 5962-42-5),

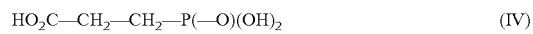

C.2.2) compound of formula (V) (3,9-bis[2,4-bis(1,1-dimethylethyl)phenoxy]-2,4,8,10-tetraoxa-3,9-diphosphaspiro[5.5]undecane, CAS # 26741-53-7),

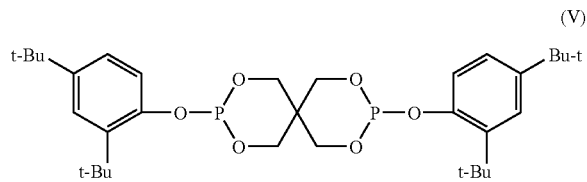

C.2.3) compound of formula (VI) (2,4-bis(1,1-dimethylethyl)-phenol-1,1',1''-phosphite, CAS # 31570-04-4),

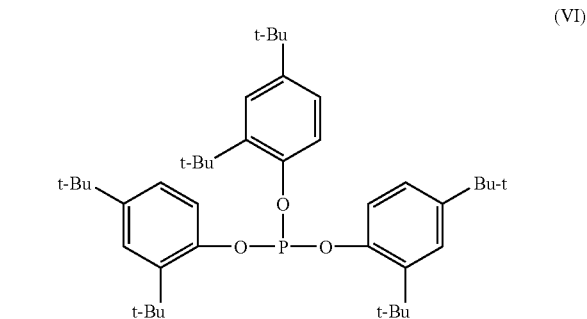

C.2.4) ort/70-phosphoric acid of formula (VII) (CAS # 7664-38-2),

—C.2.5) compound of formula (VIII) (P,P'-[[1,1'-biphenyl]-4,4'-diyl]bis-, P,P,P',P'-tetrakis[2,4-bis(1,1-dimethylethyl)phenyl]-phosphonic acid ester, CAS # 38613-77-3)

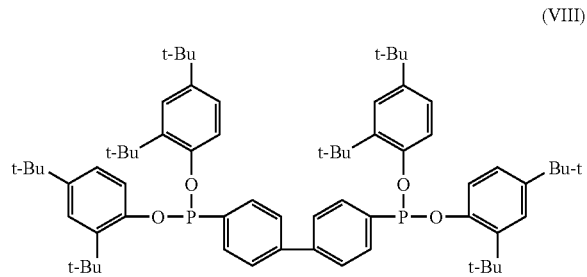

and

C.2.6) phosphorous acid $H_3PO_3$ (CAS # 10294-56-1).

The concentrate C) can be prepared, for example, as follows:

(i-1) the components

C.1) from 98 wt. % to 70 wt. %, preferably from 93 wt. % to 80 wt. % (based on the sum of the wt. % of C.1)+C.2)) of a melt, preferably having a temperature of from 180 to 300° C., particularly preferably from 200 to 270° C., of polyalkylene terephthalate, preferably polyethylene terephthalate or polybutylene terephthalate, particularly preferably polybutylene terephthalate, and C.2) from 2 wt. % to 30 wt. %, preferably from 7 wt. % to 20 wt. % (based on the sum of the wt. % of C.1)+C.2)) of at least one compound selected from the group consisting of ortho-phosphoric acid, phosphorous acid, carboxylic acid esters of ortho-phosphoric acid and carboxylic acid esters of phosphorous acid, component C.2) being used in the form of a solid or in liquid form, are mixed in any desired manner, preferably at temperatures of from 180° C. to 320° C., particularly preferably from 200° C. to 270° C., and preferably in devices such as internal kneaders, extruders and twin-shaft screws (this process step is also referred to as "melt compounding") and (i-2) the resulting mixture is then melt extruded, the resulting mixture preferably being cooled to a temperature of from −20° C. to 100° C., particularly preferably from 10 to 40° C., so that the concentrate C is obtained in solid form.

Component D

Component D is optional. Component D preferably comprises one or more graft polymers of D.1 from 5 to 95 wt. %, preferably from 30 to 90 wt. %, of at least one vinyl monomer on D.2 from 95 to 5 wt. %, preferably from 70 to 10 wt. %, of at least one graft base selected from the group consisting of diene rubbers, EP(D)M rubbers (i.e. those based on ethylene/propylene and optionally diene), acrylate, polyurethane, silicone, silicone acrylate, chloroprene and ethylene/vinyl acetate rubbers.

The graft base D.2 generally has a mean particle size ($d_{50}$ value) of from 0.05 to 10 μm, preferably from 0.1 to 5 μm, particularly preferably from 0.2 to 1 μm.

The gel content of the graft base D.2 is at least 20 wt. %, in the case of graft bases D.2 prepared by emulsion polymerisation preferably at least 40 wt. % (measured in toluene).

Monomers D.1 are preferably mixtures of

D.1.1 from 50 to 99 parts by weight vinyl aromatic compounds and/or vinyl aromatic compounds substituted on the ring (such as styrene, α-methylstyrene, p-methylstyrene, p-chlorostyrene) and/or (meth)acrylic acid ($C_1$-$C_8$)-alkyl esters (such as methyl methacrylate, ethyl methacrylate) and D.1.2 from 1 to 50 parts by weight vinyl cyanides (unsaturated nitriles such as acrylonitrile and methacrylonitrile) and/or (meth)acrylic acid ($C_1$-$C_8$)-alkyl esters, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers D.1.1 are selected from at least one of the monomers styrene, α-methylstyrene and methyl methacrylate, and preferred monomers D.1.2 are selected from at least one of the monomers acrylonitrile, maleic anhydride and methyl methacrylate. Particularly preferred monomers are D.1.1 styrene and D.1.2 acrylonitrile.

Preferred graft bases D.2 are acrylate rubbers, silicone acrylate rubbers, diene rubbers (for example based on butadiene and isoprene) or mixtures of diene rubbers. Within the scope of the invention, diene rubbers are also to be understood as being copolymers of diene rubbers or mixtures thereof with further copolymerisable monomers (e.g. according to D.1.1 and D.1.2). The graft bases D.2 generally have a glass transition temperature of <10° C., preferably <0° C., particularly preferably <−10° C.

Particularly preferred polymers D are, for example, ABS polymers (emulsion, mass and suspension ABS), as are described, for example, in DE-OS 2 035 390 (=U.S. Pat. No. 3,644,574) or in DE-OS 2,248,242 (=GB-PS 1 409 275) or in Ullmauns, Enzyklopädie der Technischeni Chemie, Vol. 19 (1980), p. 280 ff.

The graft polymer of components D.1 and D.2 preferably has a core/shell structure, component D.1 forming the shell (also referred to as the casing) and component D.2 forming the core (see e.g. Ullmann's Encyclopedia of Industrial Chemistry, VCH-Verlag, Vol. A21, 1992, page 635 and page 656).

The graft copolymers D are prepared by radical polymerisation, for example by emulsion, suspension, solution or mass polymerisation, preferably by emulsion or mass polymerisation.

Particularly suitable graft rubbers are also ABS polymers prepared by the emulsion polymerisation process by redox initiation with an initiator system of organic hydroperoxide and ascorbic acid according to U.S. Pat. No. 4,937,285.

Because it is known that the graft monomers are not necessarily grafted onto the graft base completely in the graft reaction, graft polymers D according to the invention are also to be understood as being products that are obtained by (co) polymerisation of the graft monomers in the presence of the graft base and that are obtained concomitantly during working up.

Suitable acrylate rubbers according to D.2 for the polymers D are preferably polymers of acrylic acid alkyl esters, optionally with up to 40 wt. %, based on D.2, of other polymerisable, ethylenically unsaturated monomers. The preferred polymerisable acrylic acid esters include $C_1$- to $C_8$-alkyl esters, for example methyl, ethyl, butyl, n-octyl and 2-ethylhexyl ester; haloalkyl esters, preferably halo-$C_1$-$C_8$-alkyl esters, such as chloroethyl acrylate, and mixtures of these monomers.

For crosslinking, monomers having more than one polymerisable double bond can be copolymerised. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbezenes; but also triallyl phosphate and diallyl phthalate. Preferred crosslinking monomers are allyl methacrylate, ethylene glycol dimethacrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexylhydro-s-triazine, triallylbenzenes. The amount of crosslinking monomers is preferably from 0.02 to 5 wt. %, in particular from 0.05 to 2 wt. %, based on the graft base D.2. In the case of cyclic crosslinking monomers having at least three ethylenically unsaturated groups, it is advantageous to limit the amount to less than 1 wt. % of the graft base D.2.

Preferred "other" polymerisable, ethylenically unsaturated monomers which can optionally be used, in addition to the acrylic acid esters, in the preparation of the graft base D.2 are, for example, acrylonitrile, styrene, α-methylstyrene, acrylamides, vinyl $C_1$-$C_6$-alkyl ethers, methyl methacrylate, butadiene. Preferred acrylate rubbers as graft base D.2 are emulsion polymers having a gel content of at least 60 wt. %.

Suitable silicone rubbers according to D.2 can be prepared by emulsion polymerisation, as described, for example, in U.S. Pat. No. 2,891,920 and U.S. Pat. No. 3,294,725. Further suitable graft bases according to D.2 are silicone rubbers having graft-active sites, as are described in DE-OS 3 704 657, DE-OS 3 704 655, DE-OS 3 631 540 and DE-OS 3 631 539.

Silicone acrylate rubbers are also suitable according to the invention as graft bases D.2. These silicone acrylate rubbers are composite rubbers having graft-active sites containing from 10 to 90 wt. % silicone rubber and from 90 to 10 wt. % polyalkyl (meth)acrylate rubber, the two mentioned rubber components interpenetrating in the composite rubber so that they cannot substantially be separated from one another. If the content of the silicone rubber component in the composite rubber is too high, the finished resin compositions have disadvantageous surface properties and impaired dyeability. If, on the other hand, the content of the polyalkyl (meth)acrylate rubber component in the composite rubber is too high, the impact strength of the finished resin composition is adversely affected. Silicone acrylate rubbers are known and are described, for example, in U.S. Pat. No. 5,807,914, EP 430134 and U.S. Pat. No. 4,888,388. A graft polymer prepared by emulsion polymerisation with D.1 methyl methacrylate and D.2 silicone acrylate composite rubber is preferably used.

The gel content of the graft base D.2 is determined at 25° C. in a suitable solvent (M. Hoffmann., H. Krömer, R. Kuhn. Polymeranalytik I und II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid. Z. und Z. Polymere 250 (1972), 782-796).

Component E

The composition can optionally contain one or more further additives (including any desired additives or any commercially available additives) according to component E), such as vinyl (co)polymers, flameproofing agents, flameproofing synergists, antidripping agents (for example compounds of the substance classes of the fluorinated polyolefins, of the silicones and aramid fibres), lubricants and mould release agents (for example pentaerythritol tetrastearate), nucleating agents, stabilisers, antistatics (for example conductive blacks, carbon fibres, carbon nanotubes and also organic antistatics such as polyalkylene ethers, alkylsulfonates or polyamide-containing polymers), acids, fillers and reinforcing agents (for example glass or carbon fibres, mica, kaolin, talc, CaCO, and glass flakes) and also colourings and pigments. The fluorinated polyolefins are preferably used in the form of a coagulated mixture of emulsions of fluorinated polyolefins with emulsions of a vinyl (co)polymer, particularly preferably with emulsions of a copolymer based on styrene/acrylonitrile.

Suitable as vinyl (co)polymers are polymers of at least one monomer from the group of the vinyl aromatic compounds, vinyl cyanides (unsaturated nitriles), (meth)acrylic acid ($C_1$-$C_8$)-alkyl esters, unsaturated carboxylic acids and also derivatives (such as anhydrides and imides) of unsaturated carboxylic acids. The vinyl (co)polymers are resin-like, thermoplastic and rubber-free. The vinyl (co)polymers are known and can be prepared by radical polymerisation, in particular by emulsion, suspension, solution or mass polymerisation. The vinyl (co)polymers preferably have mean molecular weights Mw (weight average, determined by light scattering or sedimentation) of from 15,000 to 200,000. Particularly suitable as vinyl (co)polymers are polymers of E.1.1 from 50 to 99 parts by weight, preferably from 60 to 80 parts by weight, of vinyl aromatic compounds and/or vinyl aromatic compounds substituted on the ring, such as styrene, α-methylstyrene, p-methylstyrene, p-chlorostyrene, and/or (meth)acrylic acid ($C_1$-$C_8$)-alkyl esters, such as methyl methacrylate, ethyl methacrylate, and E.1.2 from 1 to 50 parts by weight, preferably from 20 to 40 parts by weight, of vinyl cyanides (unsaturated nitriles), such as acrylonitrile and methacrylonitrile, and/or (meth)acrylic acid ($C_1$-$C_8$)-alkyl esters, such as methyl methacrylate, n-butyl acrylate, tert-butyl acrylate, and/or unsaturated carboxylic acids, such as maleic acid, and/or derivatives, such as anhydrides and imides, of unsaturated carboxylic acids, for example maleic anhydride and N-phenylmaleimide.

Preparation of the Molding Compositions and Moulded Bodies

The invention provides a process for the preparation of polycarbonate/polyalkylene terephthalate compositions having improved melt stability, which process was described supra. In an exemplary process, the individual constituents can be mixed in the first and second process step in any desired manner either in succession or simultaneously, either at about 20° C. (room temperature) or at a higher temperature, preferably in the first step at temperatures of advantageously from 180° C. to 320° C., particularly preferably from 200° C. to 270° C., or in the second step at temperatures of advantageously from 200° C. to 320° C., preferably from 240° C. to 300° C.

The invention also provides processes for the preparation of the moulding compositions and the use of the moulding compositions in the production of moulded bodies, and the mouldings themselves.

The moulding compositions according to the invention can be used, for example, in the production of moulded bodies of any kind. These can be produced, for example, by injection moulding, extrusion and blow moulding processes. A further form of processing is the production of moulded bodies by deep drawing from previously produced sheets or films.

Examples of such moulded bodies include films, profiles, casing parts of any kind, for example for domestic appliances such as televisions, juice extractors, coffee machines, mixers; for office machines such as monitors, flat screens, notebooks, printers, copiers; sheets, pipes, conduits for electrical installations, windows, doors and other profiles for the construction sector (interior fittings and external applications) as well as electrical and electronic parts such as switches, plugs and sockets, as well as bodywork and interior components for commercial vehicles, in particular for the automotive sector.

The moulding compositions according to the invention can in particular also be used, for example, in the production of the following moulded bodies or mouldings: interior fittings for railway vehicles, ships, aircraft, buses and other motor vehicles, casings for electrical devices containing small transformers, casings for devices for processing and transmitting information, casings and cladding for medical devices, massage devices and casings therefor, toy vehicles for children, prefabricated wall panels, casings for security devices and for televisions, heat-insulated transport containers, mouldings for sanitary and bathroom fittings, gratings for ventilator openings and casings for gardening tools.

The examples which follow serve to illustrate the invention further.

EXAMPLES

Component A1

Linear polycarbonate based on bisphenol A having a viscosity eta(rel.) of 1.293 (measuring conditions: 5 g of polycarbonate per litre of methylene chloride, 25° C.) and a molecular weight Mw of 29,208±1036 g/mol (determined by GPC methods against polycarbonate standard).

Component A2

Linear polycarbonate based on bisphenol A having a viscosity eta(rel.) of 1.280 (measuring conditions: 5 g of polycarbonate per litre of methylene chloride, 25° C.) and a molecular weight Mw of 27,914±1036 g/mol (determined by GPC methods against polycarbonate standard).

Component A3

Linear polycarbonate based on bisphenol A having a viscosity eta(rel.) of 1.255 (measuring conditions: 5 g of polycarbonate per litre of methylene chloride, 25° C.) and a molecular weight Mw of 24,289±1036 g/mol (determined by GPC methods against polycarbonate standard).

Component B1

Polyethylene terephthalate, intrinsic viscosity=0.68 dl/g (Invista® RT 6012, Invista Resins and Fibers GmbH, Germany)

Component B2

Polyethylene terephthalate, intrinsic viscosity=0.59 dl/g (Voridian® 21350, Eastman Chemical Co, USA)

Component B3

Polybutylene terephthalate (Pocan® B1300, Lanxess AG, DE) having a viscosity number of 105 cm³/g.

Component C

The particular concentrate C-I to C-V (see Table 1 below) is prepared as follows:
(i-1) the components
  C.1) 85 wt. % (based on the sum of the wt. % of C.1)+ C.2)) of a melt of polyalkylene terephthalate B2 or B3 (see Table 1) having a temperature of 225° C. and
  C.2) 15 wt. % (based on the sum of the wt. % of C.1)+ C.2)) of a compound selected from C.2.1 to C.2.6, which is used in the form of a solid or in liquid form, are mixed at a temperature of from 225° C. to 240° C.

on a twin-shaft screw (ZSK-25, Coperion, USA) at 225 rpm and with a throughput of from 10 to 12 kg/h and
(i-2) the resulting mixture is then melt extruded, the resulting mixture being cooled to room temperature by means of a water bath and granulated.

Component C.2.1: Albritect® PM2 (Rhodia, FR), compound of formula (IV)

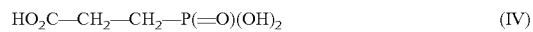

Component C.2.2: Ultranox® 626A (Chemtura, USA), compound of formula (V)

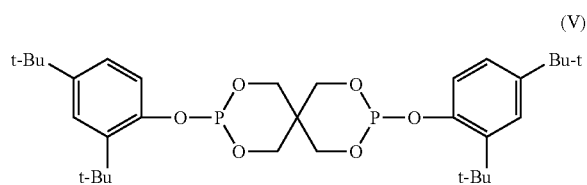

Component C.2.3: Irgafos® 168 (Ciba Specialty Chemicals, CH) compound of formula (VI)

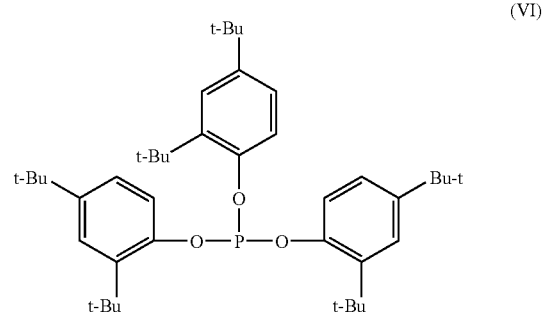

Component C.2.4: ortho-phosphoric acid $H_3PO_4$ (Fluka)
Component C.2.5: Irgafos® P-EPQ (Ciba Specialty Chemicals, CH) compound of formula (VIII)

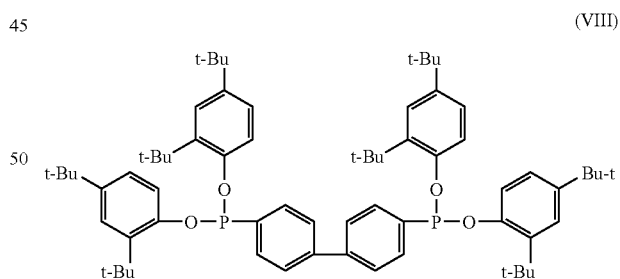

Component C.2.6: phosphorous acid, $H_3PO_3$

TABLE 1

| [wt. %] | Composition of the concentrates C) | | | | | | |
| --- | --- | --- | --- | --- | --- | --- | --- |
|  | C-I | C-II | C-III | C-IV | C-V | C-VI | C-VII |
| C.1 |  |  |  |  |  |  |  |
| B2 |  |  |  |  |  |  | 85 |
| B3 | 85 | 85 | 85 | 85 | 85 | 85 |  |

TABLE 1-continued

Composition of the concentrates C)

| [wt. %] | C-I | C-II | C-III | C-IV | C-V | C-VI | C-VII |
|---|---|---|---|---|---|---|---|
| C.2 | | | | | | | |
| C.2.1 | 15 | | | | | | |
| C.2.2 | | 15 | | | | | 15 |
| C.2.3 | | | 15 | | | | |
| C.2.4 | | | | 15 | | | |
| C.2.5 | | | | | 15 | | |
| C.2.6 | | | | | | 15 | |

Component D1

Impact modifier having a core/shell structure, core: polybutyl acrylate, shell: polymethyl methacrylate (Paraloid® EXL 2300, Rohm and Haas, USA).

Component D2

ABS having a core/shell structure, prepared by emulsion polymerisation (core: polybutadiene rubber having a mean weight-average particle size $d_{50}$=375 nm, shell: poly(styrene-acrylonitrile), weight ratio styrene:acrylonitrile=73:27, the weight ratio of polybutadiene to poly(styrene-acrylonitrile) is 75:25).

Component D3

Impact modifier having a core/shell structure, core: polybutadiene, shell: polymethyl methacrylate (Paraloid® EXL 2650, Rohm and Haas, USA).

Component E1

Talc, Naintsch® A3C(RiO Tinto)

Component E2

Luwax® E (montanic acid ester, BASF AG, Germany, CAS # 248600-35-3)

Component E3

Pentaerythritol tetrastearate

The melt viscosity was determined in accordance with DIN 54811 or ISO 11443.

The melt stability of the composition in question is evaluated by the following methods:

(1) Determination of the Difference Between the Normal MVR Value and the "MVR+19 min" Value:

The thermoplastic flowability (MVR) (melt volume flow rate) is determined in accordance with DIN EN ISO 1133. To this end, two different determination variants are used. The "normal" determination of the MVR value is carried out with a dwell time of 4 minutes in the device—Determination of the "MVR+19 min" value is carried out with a dwell time of 19 minutes in the device. The smaller the difference between the normal MVR value and the "MVR+19 min" value (referred to hereinbelow as "delta MVR", for calculation see formula IX below), the higher (better) the melt stability of the tested composition:

$$deltaMVR = \frac{[MVR+19\ min] - [MVR]}{[MVR]} \cdot 100\% \quad (IX)$$

(2) Determination of the Difference Between the $T_m$ Value of the 3rd Heating Operation and the $T_m$ Value of the 1st Heating Operation in the DSC Measurement In a conventional device for determining the melting temperature by means of DSC (differential scanning calorimetry), from 0.01 to 0.02 g of the composition to be tested is heated, under a nitrogen atmosphere (dissipated at 200 ml/minute), from 25° C. to 300° C. with a gradient of 10° C./minute and, when the temperature of 300° C. has been reached, is cooled to 25° C. with a gradient of −10° C./minute. This operation is repeated twice more, so that the composition was heated three times and cooled twice in total. During the heating operation, an endothermal signal is recorded, and the temperature which corresponds to the maximum of the endothermal signal is determined (referred to as $T_m$ hereinbelow). This $T_m$ value typically falls with each heating operation: The smaller the difference between the $T_m$ value of the 2nd or 3rd heating operation and the $T_m$ value of the 1st heating operation (referred to hereinbelow as "delta $T_m(2-1)$" or "delta $T_m(3-1)$", for calculation see formula Xa or Xb below), the higher (better) the melt stability of the tested composition.

$$deltaT_m(2-1) = T_m(scan2) - T_m(scan1) \quad (Xa)$$

$$deltaT_m(3-1) = T_m(scan3) - T_m(scan1) \quad (Xb)$$

The compositions according to the invention (see Tables 2 to 5 below) each contain a concentrate (component C-I to C-VII). By contrast, no concentrate is used in the preparation of the comparison examples, but all the constituents are mixed with one another in one step.

The filler-containing PC/PET moulding compositions according to the invention (see Table 2, composition 3 or 4) exhibit a higher melt stability (i.e. a lower delta MVR value and/or a smaller difference between the $T_m$ values) than the corresponding compositions that were prepared without a concentrate of C.2.1 or C.2.2 and B3 (comparison examples 1 and 2).

TABLE 2

Filler-containing PC/PET moulding compositions

| | 1 (comp.) | 2 (comp.) | 3 | 4 |
|---|---|---|---|---|
| [parts by weight] | | | | |
| A1 | 63.67 | 63.67 | 63.67 | 63.67 |
| B1 | 34.64 | 34.64 | 34.64 | 34.64 |
| B3 | 1.44 | 1.44 | | |
| C-I | | | 1.70 | |
| C-II | | | | 1.70 |
| C.2.1 | 0.26 | | | |
| C.2.2 | | 0.26 | | |
| D1 | 15.5 | 15.5 | 15.5 | 15.5 |
| E1 | 13.0 | 13.0 | 13.0 | 13.0 |
| E2 | 0.5 | 0.5 | 0.5 | 0.5 |
| Properties | | | | |
| MVR 280° C./5 kg [cm³/10 min] | 33.60 | 22.66 | 34.03 | 28.20 |
| MVR 280° C./5 kg + 19 min [cm³/10 min] | 50.48 | 16.33 | 42.66 | 32.62 |
| delta MVR [%] | (+50%) | (−28%) | (+25%) | (+16%) |
| DSC, $T_m$ (scan 1) [° C.] | 257.83 | 258.33 | 258.67 | 258.00 |
| DSC, $T_m$ (scan 2) [° C.] | 252.67 | 243.83 | 252.83 | 250.50 |
| delta $T_m$ (2 − 1) [° C.] | (−5.16) | (−14.50) | (−5.84) | (−7.50) |
| DSC, $T_m$ (scan 3) [° C.] | 249.17 | 242.57 | 250.00 | 244.83 |
| delta $T_m$ (3 − 1) [° C.] | (−8.66) | (−15.76) | (−8.67) | (−13.17) |

The impact-modified PC/PBT moulding compositions according to the invention (see Table 3, composition 5 to 8) exhibit a higher melt stability (i.e. a lower delta MVR value and a smaller difference between the $T_m$ values) than the corresponding compositions that were prepared without a concentrate (comparison example 10) or without any phosphorus-containing stabiliser at all (comparison example 9).

TABLE 3

Impact-modified PC/PBT moulding compositions

|  | 5 | 6 | 7 | 8 | 9 (comp.) | 10 (comp.) |
|---|---|---|---|---|---|---|
| [parts by weight] | | | | | | |
| A3 | 58.28 | 58.28 | 58.28 | 58.28 | 59.18 | 58.28 |
| B3 | 40.20 | 40.20 | 40.20 | 40.20 | 40.82 | 41.49 |
| C-I | 1.52 | | | | | |
| C-III | | 1.52 | | | | |
| C-IV | | | 1.52 | | | |
| C-V | | | | 1.52 | | |
| C.2.3 | | | | | | 0.23 |
| D2 | 16.3 | 16.3 | 16.3 | 16.3 | 16.6 | 16.3 |
| E3 | 0.2 | 0.2 | 0.2 | 0.2 | 0.2 | 0.2 |
| Properties | | | | | | |
| MVR 260° C./5 kg [cm³/10 min] | 22.71 | 30.01 | 33.27 | 30.25 | 30.04 | 28.59 |
| MVR 260° C./5 kg + 19 min [cm³/10 min] | 20.32 | 25.37 | 26.24 | 20.37 | 16.37 | 16.47 |
| delta MVR [%] | (−11%) | (−15%) | (−21%) | (−33%) | (−46%) | (−42%) |
| DSC, $T_m$ (scan 1) [° C.] | 226.33 | 227.33 | 227 | 226.83 | 227.33 | 227.83 |
| DSC, $T_m$ (scan 2) [° C.] | 222.67 | 218 | 221.33 | 214.67 | 213.5 | 213.67 |
| delta $T_m$ (2 − 1) [° C.] | (−3.66) | (−9.33) | (−5.67) | (−12.16) | (−13.83) | (−14.16) |
| DSC, $T_m$ (scan 3) [° C.] | 222.5 | 214.67 | 221 | 203.67 | 201.33 | 200.83 |
| delta $T_m$ (3 − 1) [° C.] | (−3.83) | (−12.66) | (−6.00) | (−23.16) | (−26.00) | (−27.00) |

The impact-modified PC/PBT moulding composition according to the invention (see Table 4, composition 12) exhibits a higher melt stability (i.e. a lower delta MVR value and a smaller difference between the $T_m$ values) than the corresponding compound prepared without a concentrate (comparison example 11).

The impact-modified PC/PET moulding composition according to the invention (see Table 5, composition 13) exhibits a higher melt stability (i.e. a lower delta MVR value and a smaller difference between the $T_m$ values) than the corresponding composition prepared without a concentrate (comparison example 14).

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

The use of singular article terms including "an", "a" and "the" can connote the singular or plural of the object that follows.

TABLE 4

Impact-modified PC/PBT moulding compositions and PBT/H₃PO₃ concentrate

|  | 11 (comp.) | 12 |
|---|---|---|
| [parts by weight] | | |
| A2 | 49.97 | 49.97 |
| B3 | 49.97 | 49.67 |
| C-VI | | 0.36 |
| C.2.6 | | 0.06 |
| D3 | 11.1 | 11.1 |
| Properties | | |
| Melt viscosity (265° C./500 s⁻¹) | 330 | 322 |
| MVR 265° C./5.0 kg [cm³/10 min] | 33.22 | 35.43 |
| MVR 265° C./5.0 kg + 19 min [cm³/10 min] | 36.61 | 38.29 |
| delta MVR [%] | (+10%) | (+8%) |
| DSC, $T_m$ (scan 1) [° C.] | 227.17 | 226 |
| DSC, $T_m$ (scan 2) [° C.] | 223.5 | 223.5 |
| delta $T_m$ (2 − 1) [° C.] | (−3.67) | (−2.50) |
| DSC, $T_m$ (scan 3) [° C.] | 223 | 223.17 |
| delta $T_m$ (3 − 1) [° C.] | (−4.17) | (−2.83) |

TABLE 5

Impact-modified PC/PET moulding compositions

|  | 13 | 14 (comp.) |
|---|---|---|
| [parts by weight] | | |
| A2 | 49.97 | 49.97 |
| B2 | 49.67 | 49.97 |
| C-VII | 0.36 | |
| C.2.2 | | 0.06 |
| D3 | 11.1 | 11.1 |
| Properties | | |
| MVR 265° C./5.0 kg [cm³/10 min] | 42.2 | 37.25 |
| MVR 265° C./5.0 kg + 20 min [cm³/10 min] | 27.77 | 20.9 |
| delta MVR [%] | (−34%) | (−44%) |
| DSC, $T_m$ (scan 1) [° C.] | 252.67 | 253.83 |
| DSC, $T_m$ (scan 2) [° C.] | 243.67 | 241.17 |

TABLE 5-continued

| Impact-modified PC/PET moulding compositions | | |
|---|---|---|
| | 13 | 14 (comp.) |
| delta $T_m$ (2 − 1) [° C.] | (−9.00) | (−12.66) |
| DSC, $T_m$ (scan 3) [° C.] | 241.17 | 241.5 |
| delta $T_m$ (3 − 1) [° C.] | (−11.50) | (−12.33) |

The invention claimed is:

1. A concentrate comprising:
C.1) from 98 wt. % to 70 wt. % (based on the sum of the wt. % of C.1)+C.2)) of polyalkylene terephthalate or a mixture of at least two polyalkylene terephthalates and
C.2) from 2 wt. % to 30 wt. % (based on the sum of the wt. % of C.1)+C.2)) of at least one compound selected from the group consisting of
C.2.1) the compound of formula (IV)

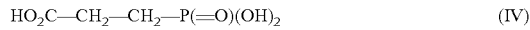

C.2.2) the compound of formula (V)

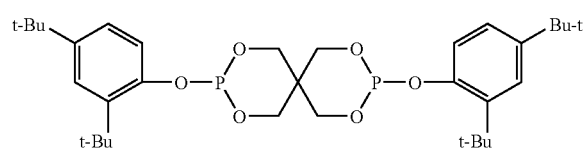

C.2.3) the compound of formula (VI)

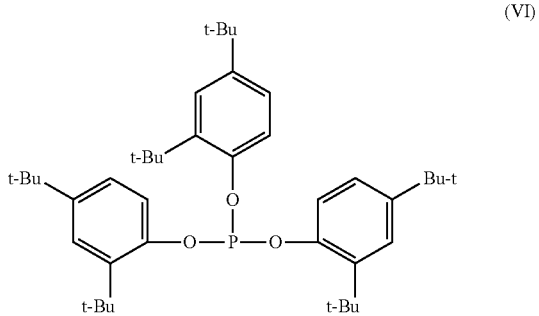

C.2.4) ortho-phosphoric acid $H_3PO_4$ (VII)
C.2.5) the compound of formula (VIII)

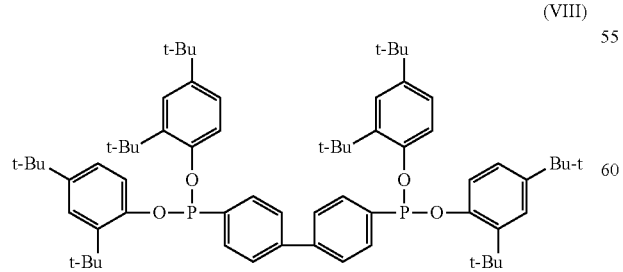

and
C.2.6) phosphorous acid $H_3PO_3$ (IX).

2. A concentrate according to claim 1 comprising from 93 wt. % to 80 wt. % (based on the sum of the wt. % of C.1)+C.2)) of component C.1) and from 7 wt. % to 20 wt. % (based on the sum of the wt. % of C.1)+C.2)) of component C.2).

3. A composition comprising
A) aromatic polycarbonate,
B) polyalkylene terephthalate and
C) a concentrate according to claim 1.

4. A composition according to claim 3 comprising
A) from 29.8 to 82.8 parts by weight (in each case based on the sum of the parts by weight of components A+B+C) of aromatic polycarbonate,
B) from 15 to 70 parts by weight (in each case based on the sum of the parts by weight of components A+B+C) of polyalkylene terephthalate,
C) from 0.2 to 5 parts by weight (in each case based on the sum of the parts by weight of components A+B+C) of said concentrate,
D) from 0 to 40 parts by weight (in each case based on the sum of the parts by weight of components A+B+C) of rubber-modified graft polymer and
E) from 0 to 20 parts by weight (based on the sum of the parts by weight of components A+B+C=100) of an additive.

5. A composition according to claim 4 comprising
A) from 39.5 to 89.5 parts by weight (in each case based on the sum of the parts by weight of components A+B+C) of aromatic polycarbonate,
B) from 25 to 55 parts by weight (in each case based on the sum of the parts by weight of components A+B+C) of polyalkylene terephthalate,
C) from 0.7 to 2 parts by weight (in each case based on the sum of the parts by weight of components A+B+C) of said concentrate,
D) from 8 to 18 parts by weight (in each case based on the sum of the parts by weight of components A+B+C) of rubber-modified graft polymer and
E) from 1 to 15 parts by weight (based on the sum of the parts by weight of components A+B+C=100) of said additive.

6. A composition according to claim 3, comprising as component B polybutylene terephthalate.

7. A process for the preparation of a polycarbonate/polyalkylene terephthalate composition having improved melt stability, said process comprising:
(i) in the first step preparing a concentrate, wherein
(1-1) the components
C.1) from 98 wt. % to 70 wt. % (based on the sum of the wt. % of C.1)+C.2)) of a melt of polyalkylene terephthalate and
C.2) from 2 wt. % to 30 wt. % (based on the sum of the wt. % of C.1)+C.2)) of at least one compound selected from the group consisting of ortho-phosphoric acid, phosphorous acid, carboxylic acid esters of ortho-phosphoric acid and carboxylic acid esters of phosphorous acid, component C.2) being used in the form of a solid or in liquid form, are mixed, and
(1-2) the resulting mixture is then melt extruded and
(ii) in a second step
(ii-1) the following constituents
A) from 29.8 to 82.8 parts by weight (in each case based on the sum of the parts by weight of components A+B+C) of aromatic polycarbonate,
B) from 15 to 70 parts by weight (in each case based on the sum of the parts by weight of components A+B+C) of polyalkylene terephthalate, C) from 0.2 to 5 parts by weight (in each case based on the sum of the parts by weight of components A+B+C) of the concentrate prepared according to step (i),
D) from 0 to 40 parts by weight (in each case based on the sum of the parts by weight of components A+B+C) of rubber-modified graft polymer and
E) from 0 to 50 parts by weight (in each case based on the sum of the parts by weight of components A+B+C=100) of additives
are mixed, and
(ii-2) melt compounded, optionally at a temperature of from 200° C. to 320° C., and
(ii-3) are then melt extruded.

8. A process according to claim 7, wherein, in step (i-2) the resulting mixture is cooled to a temperature of from −20° C. to 100° C., so that the mixture is obtained in solid form.

9. A process according to claim 7, wherein there is used as component B polybutylene terephthalate.

10. A method for improving melt stability of a composition comprising aromatic polycarbonate and polyalkylene terephthalate comprising employing a concentrate according to claim 1 in said composition.

11. A method for production of mouldings or semi-finished products comprising utilizing a composition of claim 3.

12. A moulded body comprising a composition according to claim 3.

13. A composition comprising:
A) from 29.8 to 82.8 parts by weight (in each case based on the sum of the parts by weight of components A+B+C) of aromatic polycarbonate,
B) from 15 to 70 parts by weight (in each case based on the sum of the parts by weight of components A+B+C) of polyalkylene terephthalate,
C) from 0.2 to 5 parts by weight (in each case based on the sum of the parts by weight of components A+B+C) of a concentrate comprising:
　C.1) from 98 wt. % to 70 wt. % (based on the sum of the wt. % of C.1)+C.2)) of polyalkylene terephthalate or a mixture of at least two polyalkylene terephthalates and
　C.2) from 2 wt. % to 30 wt. % (based on the sum of the wt. % of C.1)+C.2)) of at least one compound selected from the group consisting of ortho-phosphoric acid, phosphorous acid, carboxylic acid esters of ortho-phosphoric acid and carboxylic acid esters of phosphorous acid,
D) from 0 to 40 parts by weight (in each case based on the sum of the parts by weight of components A+B+C) of rubber-modified graft polymer, and
E) from 0 to 20 parts by weight (based on the sum of the parts by weight of components A+B+C=100) of an additive.

14. The concentrate of claim 1, wherein (C.2) is the compound of formula (IV)

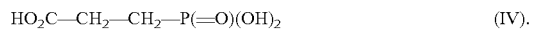

15. The concentrate of claim 1, wherein (C.2) is the compound of formula (V).

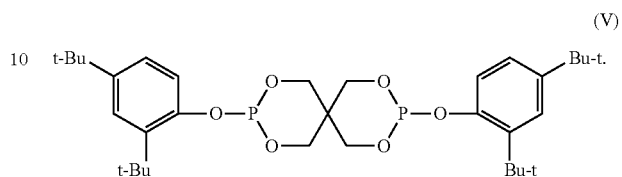

16. The concentrate of claim 1, wherein (C.2) is the compound of formula (VI)

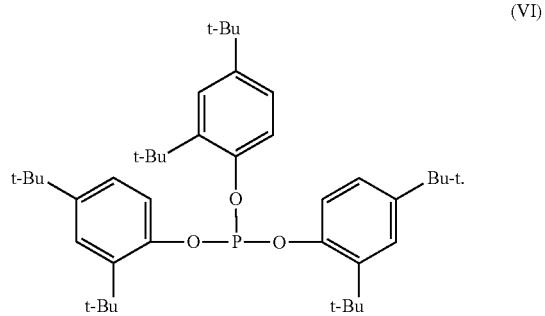

17. The concentrate of claim 1, wherein (C.2) is ortho-phosphoric acid $H_3PO_4$.

18. The concentrate of claim 1, wherein (C.2) is the compound of formula (VII)

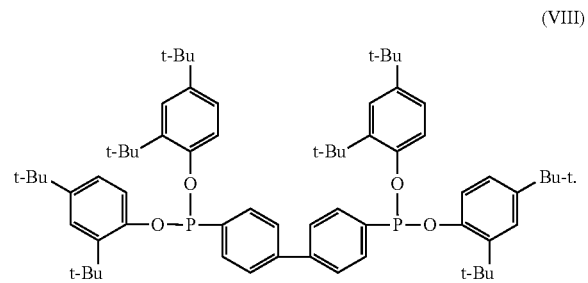

19. The concentrate of claim 1, wherein (C.2) is phosphorous acid $H_2PO_3$.

* * * * *